(12) United States Patent
Dusseaux et al.

(10) Patent No.: US 8,449,278 B2
(45) Date of Patent: May 28, 2013

(54) MOULD LINING COMPRISING A SACRIFICIAL CONNECTING ELEMENT

(75) Inventors: Jean-Raymond Dusseaux, Enval (FR); Arkadiusz Waszkiewicz, Olsztyn (PL)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/140,776

(22) PCT Filed: Dec. 16, 2009

(86) PCT No.: PCT/FR2009/052570
§ 371 (c)(1),
(2), (4) Date: Aug. 22, 2011

(87) PCT Pub. No.: WO2010/076504
PCT Pub. Date: Jul. 8, 2010

(65) Prior Publication Data
US 2011/0304082 A1   Dec. 15, 2011

(30) Foreign Application Priority Data
Dec. 17, 2008   (FR) ...................... 08 58704

(51) Int. Cl.
*B29D 30/06*   (2006.01)
*B29C 33/38*   (2006.01)

(52) U.S. Cl.
USPC ................ 425/28.1; 29/423; 425/35; 425/46

(58) Field of Classification Search
USPC ................ 425/28.1, 35, 46; 29/423
See application file for complete search history.

(56) References Cited

U.S. PATENT DOCUMENTS

| 1,482,325 | A | * | 1/1924 | Shively .................... 425/46 |
| 4,553,918 | A |   | 11/1985 | Yoda et al. |
| 4,576,559 | A | * | 3/1986 | Yoda et al. ............... 425/28.1 |
| 4,708,609 | A | * | 11/1987 | Yoda et al. ............... 425/28.1 |
| 4,992,035 | A | * | 2/1991 | Holroyd et al. ........... 425/46 |
| 5,340,294 | A |   | 8/1994 | Kata |
| 7,384,252 | B2 | * | 6/2008 | Iwamoto et al. ......... 425/28.1 |
| 7,524,175 | B2 | * | 4/2009 | Henrotte et al. .......... 425/46 |

FOREIGN PATENT DOCUMENTS

| EP | 0 523 958 A1 |   | 1/1993 |
| EP | 1541323 | * | 6/2005 |
| JP | 8-103973 |   | 4/1996 |

OTHER PUBLICATIONS

International Search Report mailed May 10, 2010 for International Application No. PCT/FR2009/052570.

\* cited by examiner

*Primary Examiner* — James Mackey
(74) *Attorney, Agent, or Firm* — Buchanan Ingersoll & Rooney PC

(57) ABSTRACT

The invention relates to a lining assembly (14) comprising a plurality of lining elements (18) intended to be attached to a support block (12) of a segment (10) of a mold for a tire, the lining elements (18) being intended to form tread blocks of part of a tread band of a tire, the assembly (14) further comprising at least one sacrificial connecting element (24) joining the lining elements (18) together.

7 Claims, 1 Drawing Sheet

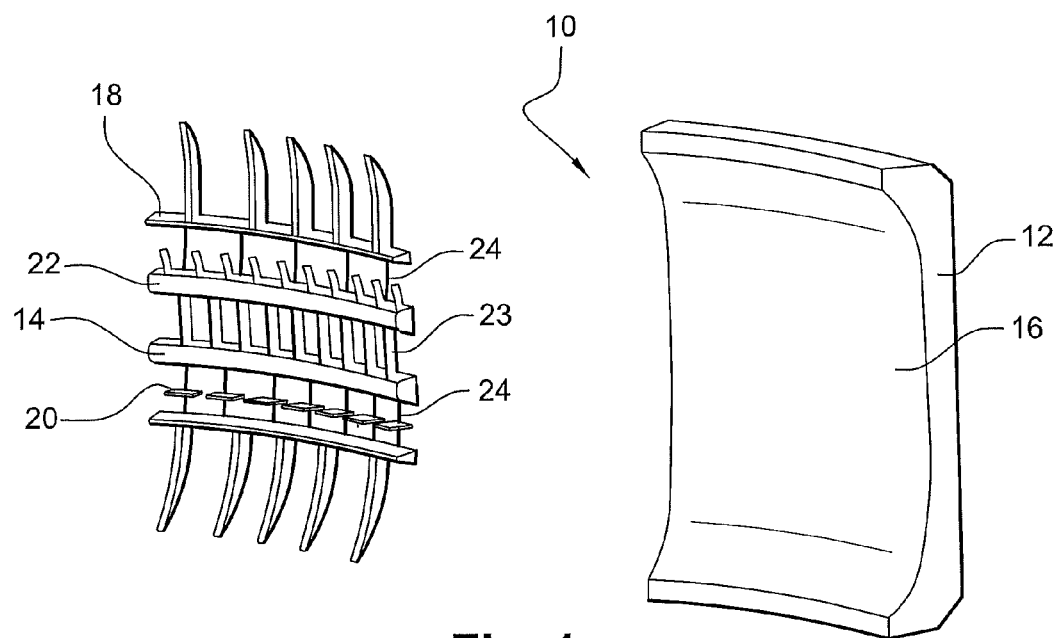
Fig. 1
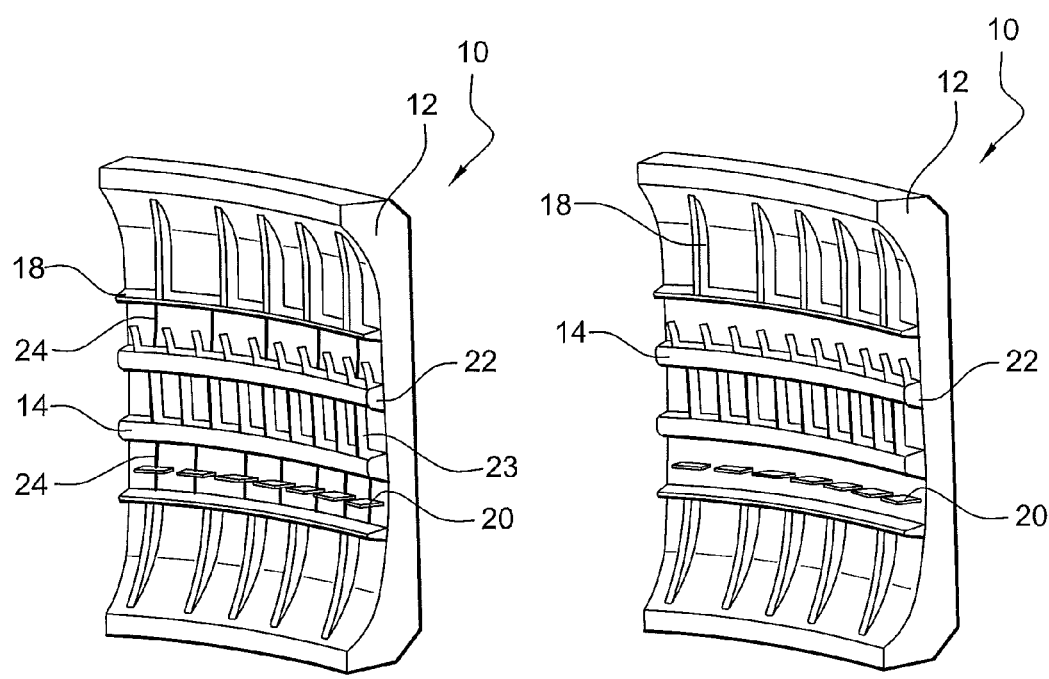
Fig. 2
Fig. 3

MOULD LINING COMPRISING A SACRIFICIAL CONNECTING ELEMENT

The invention relates to the field of tire vulcanizing moulds, more particularly moulds of the segmented type.

A segmented mould comprises several separate pieces which, when brought relatively closer together, delimit a near-toroidal molding space. In particular, a segmented mould comprises two lateral shells for molding the sidewalls of the tire, and several peripheral segments situated between the shells for molding the tread band of the tire. All of these pieces are brought closer together with appropriate dynamics using a suitable mechanism. The raw or green preform of the future tire needs to be pressed firmly and held against the mould in order to obtain geometric dimensions and a precise architecture and in order to impart the tread band tread pattern.

To form the tread patterns of the tread band the segments of the mould comprise elements projecting from the radially interior surface of the segments, these elements forming a negative of the tread patterns that are to be molded.

In order for one and the same mould to be able to be used to manufacture tires with different designs of tread pattern, it is known practice, for example from document EP 0 523 958, for a mould segment to be made up of a number of elements: firstly a support block of a generic shape that defines the overall curvature of the tread band of the tire, and secondly a plurality of lining elements which are attached to the support block and are intended to form the tread patterns of the tire tread band.

Thus, in order to adapt a mould to suit the manufacture of a tire of given tread pattern, it is necessary to attach different lining elements to each support block of the mould segments.

These operations of adapting the mould may prove lengthy and painstaking. Hence, it is a notable object of the invention to propose a segmented mould for vulcanizing a tire which can be manufactured and/or adapted simply and quickly.

To this end, one subject of the invention is a lining assembly produced by laser sintering and comprising a plurality of lining elements intended to be attached to a support block of a mould for a tire, the lining elements being intended to form tread blocks of part of a tread band of a tire, the assembly further comprising at least one sacrificial connecting element joining the lining elements together, the lining elements and the connecting element being produced as a single piece.

By virtue of the invention, all the lining elements that are intended to be attached to one and the same support block of one segment of the mould are joined together so that all the lining elements of one and the same segment can be attached to the support block in a single step.

Furthermore, the connecting element also acts as an element ensuring the relative positioning of the various lining elements of one and the same segment. Thus it is necessary merely to position one of the lining elements on the support block of a segment and the other lining elements will also be correctly positioned indirectly thanks to the connecting elements.

The connecting element is said to be sacrificial because it is intended to be detached from the lining elements and disconnected from the lining assembly once the lining assembly has been attached to the segment support block. Thus, when a tire is being molded in a mould comprising an assembly according to the invention, the connecting element is not present in the mould. In other words, the connecting element is not intended to form the tread patterns of the tread band of the tire but is intended merely to join the lining elements together until such time as they have been attached to the support block.

The assembly is produced by selective laser melting, more commonly known as SLM or laser sintering. The objects are produced by the selective melting of powders and are built up by the superposition of layers. The benefit of this component manufacturing technique is that the shape of the component can be modeled by a computer and the component can easily be manufactured by sintering on the basis of this model. Specifically, the laser can be controlled by a computer containing a model of the component and the component can then be manufactured by the successive sintering of superposed layers of powder. In the case of the manufacture of a mould lining, this technique is particularly well suited because it allows small-sized lining elements such as the sipe blades, the bands or the sacrificial connecting elements to be manufactured.

Finally, the use of laser sintering makes it possible to improve the detachability of the lining elements joined together by the sacrificial elements. Specifically, laser sintering makes it possible, firstly, to produce sacrificial elements which are lightweight but sufficiently rigid to allow correct positioning of the lining elements and, secondly, to produce sacrificial elements which are sized in such a way as to allow quick and easy mutual separation of the lining elements.

An assembly according to the invention may further comprise the following features. The assembly comprises rupture initiators where the connecting element joins the lining element. Thus, the connecting element can be disconnected from the lining elements easily. The rupture initiator may for example be obtained by a local reduction in the thickness of the connecting element.

Another subject of the invention is a segment of a tire vulcanizing mould, comprising a support block and an assembly as previously defined, attached to the support block.

Another subject of the invention is a tire vulcanizing mould, comprising two lateral shells and a plurality of segments as previously defined, the segments being circumferentially distributed around the edge of the shells.

Another subject of the invention is a method of obtaining a tire vulcanizing mould, comprising the following steps:
  the manufacturing of a lining assembly as previously defined,
  attaching the lining assembly to a support block,
  eliminating the sacrificial element.

Thus, the method of obtaining or of adapting the segment of the vulcanizing mould is particularly simple because it entails just one step of positioning the entire lining assembly with respect to the support block and of attaching this lining assembly. There is no need, as there was in the prior art, to position the various lining elements one after another on the support block.

Once this attachment step has been performed, all that is required is for the sacrificial element(s) to be eliminated as these are not intended to form the tread patterns of the tread band of the tire but are intended only to hold the various lining elements together while they are being assembled onto the support block.

The method of the invention may further comprise the feature whereby the lining assembly is obtained by laser sintering. As mentioned previously, the laser sintering technique makes it possible to design a lining assembly as a single piece with the desired shape based on a metallic powder. Whereas, in the prior art, the various lining elements are small in size to make them easier to manufacture, the laser sintering technique allows a lining assembly of large dimensions and complex shape, notably comprising various types of ribs or blades of given thicknesses to be produced.

Advantageously, the lining assembly is attached to the support block by bonding, screwing or clipping.

The invention will be better understood from reading the following description given solely with reference to the accompanying figures in which:

FIG. 1 is a perspective view of a segment of a tire vulcanizing mould, according to the invention, at a preliminary step in its manufacture, FIG. 2 is a perspective view of the segment of FIG. 1, at an intermediate stage in its manufacture, FIG. 3 is a perspective view of the segment of FIG. 2 on completion of its manufacture.

FIG. 1 depicts a segment, denoted by the overall reference 10, of a tire vulcanizing mould (not depicted), at a preliminary stage in its manufacture.

A segmented mould for vulcanizing a tire comprises a plurality of segments identical or similar to the one depicted in FIG. 1. The segments are positioned one beside the other circumferentially, and thus define a cylinder for molding the tread band of the tire.

One given segment 10 is therefore intended to form part of the tread band of the tire.

The segment 10 comprises a support block 12 and a lining assembly 14 attached to the support block 12.

The support block 12, which is made, for example, of solid steel, notably comprises a radially interior surface 16 forming a support for the lining assembly 14. The surface 16 is substantially smooth and its overall shape is substantially identical to that of the part of the tire tread band that faces this support block during molding. In other words, the surface 16 has curvatures in a radial plane containing the axis of the tire and in a radial plane normal to the axis of the tire, these curvatures being substantially identical to those of the tire.

The lining assembly 14 comprises a plurality of lining elements 18 intended to form tread patterns in the tread band part of the tire, facing the segment 10.

The elements 18 notably comprise circumferential blades 20, circumferential fillets 22 or axial blades 23 joining the fillets 22 together.

Most of the lining elements 18 are joined together and form a lattice, for example of the fillets 22 with the axial blades 23. Some elements such as the circumferential blades 20, however, are separate from the other elements 18.

The lining assembly 14 further comprises sacrificial connecting elements 24 for joining certain lining elements 14 together. These sacrificial elements 24 take the form of thin ribs that form bridges joining the various lining elements 18.

In particular, as depicted in FIG. 1, connecting elements 24 join the blades 20 which are separate from the other elements 18 to a fillet 22.

Thus, thanks to the connecting elements 24, the whole assembly 14 of lining elements 18 of one and the same segment forms a connected network so that the assembly 14 comprises just one piece. The connecting elements are not intended to form tread patterns in the tread band of the tire but are simply intended to join the various lining elements together.

The lining assembly 14 is intended to be attached to the radially interior surface 16 of the support block 12 to form the segment 10. To do that, during a first step, all the lining elements 18 of the assembly 14 are attached in a single operation to the support block 12 to obtain the intermediate segment 10 depicted in FIG. 2. The elements 18 may be attached in a single operation because the assembly 14 comprises just one piece.

Next, the assembly 14 is positioned in relation to the support block 12.

Once the lining assembly 14 has been correctly positioned on the surface 16, this assembly 14 is attached to the support block 12. This attachment may for example be achieved by bonding, screwing or clipping.

Next, during a next step, the sacrificial connecting elements 24 are eliminated from the segment 10 in order to obtain a segment 10 like the one depicted in FIG. 3. It may be noted that, in this segment 10, the various lining elements 18 of the assembly 14 are no longer all joined together in the form of a connected network. In particular, the blades 20 have been separated from the circumferential fillets 22.

This step of eliminating the sacrificial connecting elements 14 can be performed in a simple way by breaking these connecting elements 24 where they join with the lining elements 18. To make this breaking operation easier it is possible either to make the connecting elements 24 as thin as possible, so as to make them weak, or for example to create reductions in thickness of these connecting elements 24 where they join with the lining elements 18 so as to facilitate and guide their detachment.

For preference, the lining assembly 14 depicted in FIG. 1 is produced by laser sintering. This technique allows this assembly 14 to be manufactured in a single piece in a relatively simple way by successively building up layers of powdered metallic material.

The invention has been described in conjunction with a segmented mould. However, this invention could equally be used in another type of mould used for vulcanizing tires.

The invention claimed is:

1. A lining assembly, produced by laser sintering, comprising:
   a plurality of lining elements capable of attachment to a support block of a mould for a tire, the lining elements capable of forming tread blocks of part of a tread band of a tire,
   at least one sacrificial connecting element joining the lining elements together, wherein the lining elements and the connecting element have been produced as a single piece; and
   at least one rupture initiator where the at least one sacrificial connecting element joins one or more of the lining elements.

2. The lining assembly according to claim 1, wherein the rupture initiator comprises a local reduction in the thickness of the connecting element.

3. A segment of a tire vulcanizing mould, comprising a support block and the lining assembly according to claim 1, attached to the support block.

4. A tire vulcanizing mould, comprising two lateral shells each having an edge, and a plurality of segments according to claim 3, the segments being circumferentially distributed around the edge of the shells.

5. A method of obtaining a tire vulcanizing mould, comprising:
   manufacturing a lining assembly according to claim 1,
   attaching the lining assembly to a support block,
   eliminating the sacrificial element.

6. The method according to claim 5, further comprising producing the lining assembly by laser sintering.

7. The method according to claim 5, wherein the attaching of the lining assembly to the support block comprises bonding, screwing or clipping.

* * * * *